May 14, 1935.　　　F. H. EZELL　　　2,001,244
COUPLING
Filed Sept. 16, 1933　　　2 Sheets-Sheet 1

Inventor
Floy H. Ezell
By *Jack A. Ashley*
Attorney

May 14, 1935.　　　F. H. EZELL　　　2,001,244
COUPLING
Filed Sept. 16, 1933　　　2 Sheets-Sheet 2
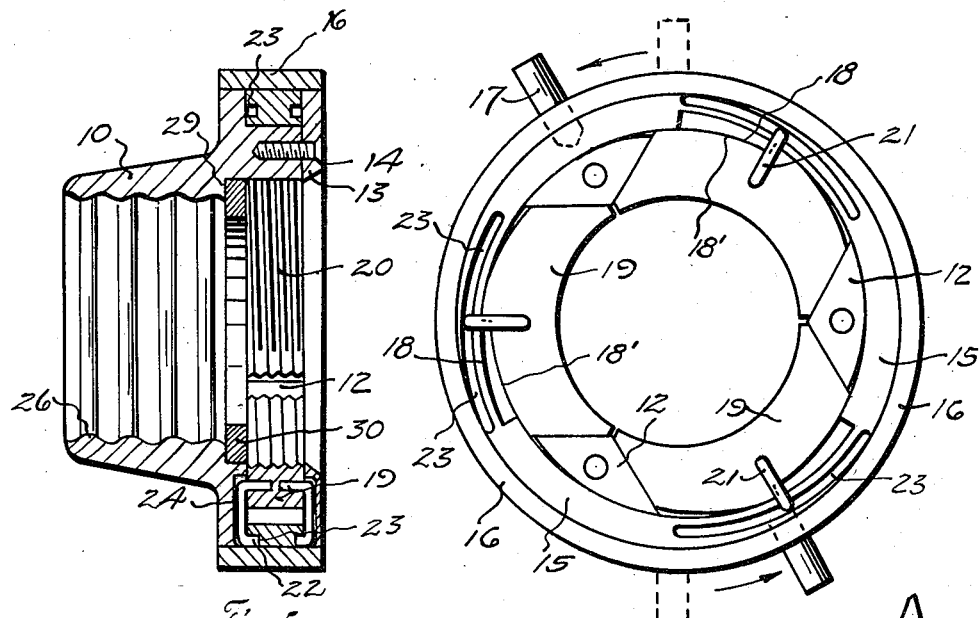
Fig. 5
Fig. 6
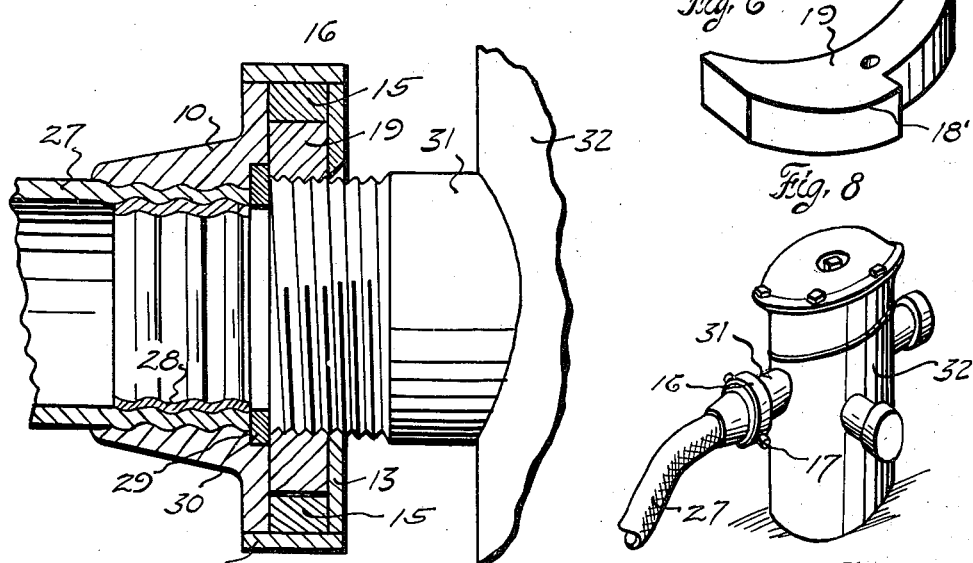
Fig. 7
Fig. 8
Fig. 9
Inventor
Floy H. Ezell
By Jack A. Ehley
Attorney Patented May 14, 1935

2,001,244

UNITED STATES PATENT OFFICE 2,001,244

COUPLING

Floy H. Ezell, Sanger, Tex., assignor, by direct and mesne assignments, of one-third to Benjamin F. Gentle, Dallas, Tex., and one-third to Jeff D. Cornett, Sanger, Tex.

Application September 16, 1933, Serial No. 689,696

8 Claims. (Cl. 285—150)

This invention relates to new and useful improvements in couplings.

One object of the invention is to provide an improved coupling, which may be quickly and easily coupled and uncoupled.

An important object of the invention is to provide an improved coupling having a plurality of gripping jaws arranged to be quickly actuated upon a short rotation of the coupling.

A further object of the invention is to provide a coupling having a plurality of movable gripping jaws with means for radially guiding said jaws and eccentric operating means connected to said jaws, whereby upon a limited rotation of the eccentric means the jaws are rapidly slid radially either into coupling position or retracted therefrom.

A construction designed to carry out the invention will be hereinafter described, together with other features of the invention.

Figure 1:
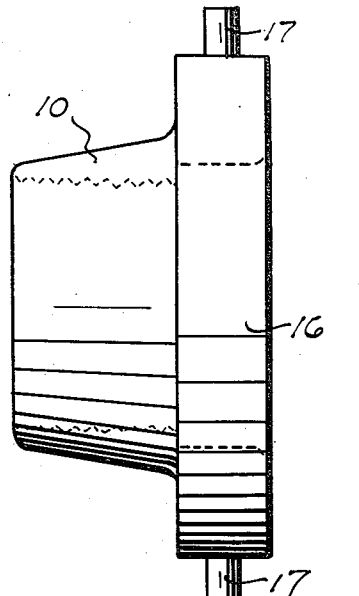
Figure 2:
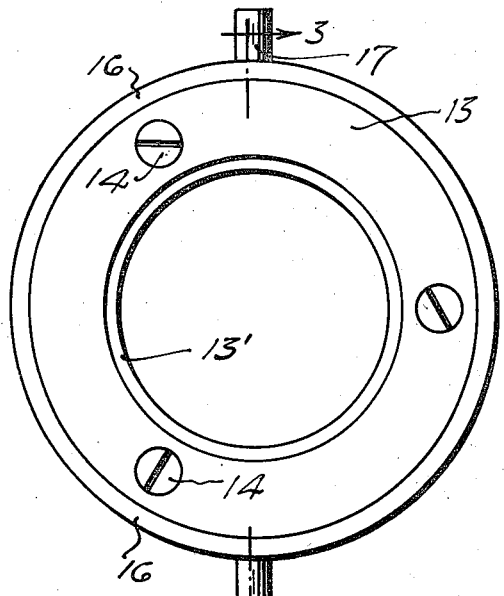
Figure 3:
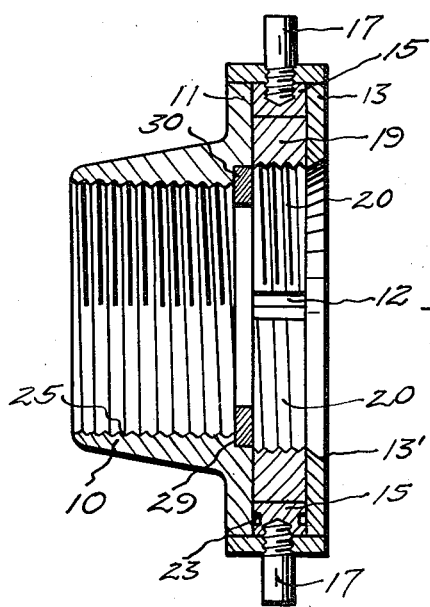
Figure 4:
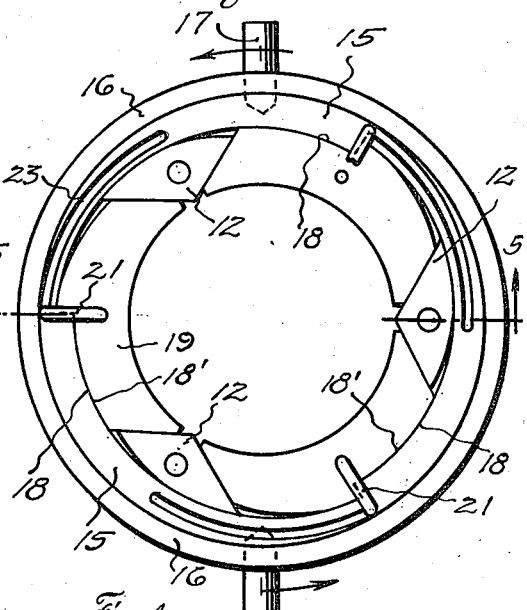

The invention will be more readily understood from a reading of the following specification and by reference to the accompanying drawings, in which an example of the invention is shown and wherein:

Figure 1 is a side elevation of a coupling constructed in accordance with the invention, Figure 2 is an end elevation of the coupling, Figure 3 is a diametrical sectional view taken on the line 3—3 of Figure 2, Figure 4 is a view similar to Figure 2, the cover ring being omitted, Figure 5 is a diametrical sectional view taken on the line 5—5 of Figure 4, Figure 6 is a view similar to Figure 4, showing the sliding jaws in expanded position, Figure 7 is a view similar to Figure 5, showing the device coupled to the nipple of a hydrant, Figure 8 is a perspective view of one of the jaws, and Figure 9 is a perspective view of the device on a hose and coupled on a fire hydrant.

In the drawings the numeral 10 designates a frusto-conical nipple having a laterally directed annular flange 11 made integral therewith. Triangular shaped guide blocks 12 formed integral with the flange and nipple extend therefrom and support a cover ring 13 on the ends thereof, said ring being fastened by screws 14. The blocks space the ring from the flange. An annular bushing 15 is rotatably confined in the space between the flange 11 and ring 13 outwardly of the guide blocks 12.

A collar 16 rotatably surrounds the flange and the ring. Short pins 17, screw-threaded on their inner ends, fasten the collar 16 to the bushing 15 and form operators for the hand to rotate the collar and bushing. Internal eccentric steps 18 are provided on the bushing. The guide blocks 12 have their outer faces curved to permit the partial passage of the eccentric steps 18.

Segmental jaws 19 are mounted to slide radially between the cover and the flange. The outer faces of the jaws have eccentric steps 18' complementary to the eccentric steps 18 of said bushing. The inner faces of the jaws have screw-threads 20. The ends of the jaws are beveled to contact with the angular faces of the blocks 12, which form guides for said jaws. The guide faces of these blocks being chordal of the circle formed by the curved inner faces 20 of the jaws 19, guide said jaws to move radially. The cover ring 13 has a central opening 13', the diameter of which is approximately the same size as the diameter of the circle formed by the jaws in their open or expanded position (Figure 4).

For retracting the jaws, each jaw 19 has radially extending keepers 21 pivotally connected on each side thereof, the outer end of each of which is provided with a trunnion 22. These keepers straddle the bushing 15 and have their trunnions engaging in eccentric grooves 23 on each side of said bushing. These grooves are concentric to the steps 18 of the bushing. The cover ring 13 and the flange 11 are provided with short radially extending grooves 24 which receive and guide the keepers, whereby said keepers are maintained in their radial positions. These keepers also act to hold the eccentric steps 18 and 18' in intimate sliding contact.

The coupling may be fastened on a hose in any suitable manner. I have shown the nipple 10 with a screw-threaded bore 25 (Figures 1 and 3) and with a convoluted or corrugated bore 26 (Figures 5 and 7). The nipple of an ordinary hose connection may be screwed into the bore 25 for attaching a hose to the coupling; while in the bore 26 a hose 27 is inserted and fastened therein by a resilient collar or ring 28. The nipple 10 has an annular recess 29 contiguous to the jaws 19 in which a gasket 30 is placed. When the coupling is placed on the nipple 31 of a hydrant 32, as is shown in Figures 7 and 9, the end of said nipple abuts the gasket 30 and forms a fluid-tight joint, whereby leakage between the jaws 19 and the flange 11 is prevented.

In operation, the collar is rotated in a clockwise direction to assure the complete expansion of the jaws 19. The coupling is placed on the nipple 31 of the hydrant 32, the nipple entering through the central opening 13' of the ring 13. The collar is rotated in a counter-clockwise direction by means of the pin 17, whereby the bushing being fastened to the collar, the eccentric steps 18 and 18' co-act to contract or close the jaws 19 on the nipple 31. The screw-threaded faces 20 of said jaws engage the screw-threads of the nipple 31, thus securely holding the coupling thereon. After the jaws have engaged the nipple 31, the coupling may be given a slight rotation in a counter-clockwise direction to further tighten the same on said nipple.

The engagement of the screw-threaded faces 20 of the jaw with the screw-threaded nipple 31 and the abutment of this nipple against the gasket will withstand a high water pressure. In Figure 2 the device is shown in an open or uncoupled position. In Figure 6 the device is shown in a closed or coupled position, the open position of the pins being shown in dotted lines. It will be noted from these two views that the device is operated by a slight rotation of the collar and bushing. The quickness with which the device may be coupled or uncoupled saves time. This, together with the ability to withstand a high water pressure makes the device very useful for fire hose. In Figure 9 the device is shown on a fire hose coupled to a fire hydrant. The device can be used for other types of hose and is not to be limited to any particular type.

The collar is rotated in a counter-clockwise direction, whereby the operations are reversed and the device is uncoupled and may be withdrawn from the nipple 31 of the hydrant 32.

The description which has been given recites more or less detail of a particular embodiment of the invention, which is set forth as new and useful, however, I desire it understood that the invention is not limited to such exact details of construction, because it is manifest that changes and modifications may be made within the scope of the appended claims without departing from the spirit of the invention.

What I claim and desire to secure by Letters Patent, is:

1. A hose coupling comprising, a member having a hose connecting element, a plurality of internally screw-threaded gripping jaws mounted on the member and arranged to form a continuous gripping surface, rotatable means having eccentrics for displacing said jaws radially to open and close the same, keepers connecting the jaws with said means, and means for actuating said rotatable means.

2. A hose coupling comprising, a member having a hose connecting element, a plurality of internally screw-threaded gripping jaws mounted on the member and arranged to form a continuous gripping surface, a rotatable bushing having eccentrics for displacing said jaws radially to open and close the same, keepers connecting the jaws of said bushing, and means for rotating said bushing.

3. A hose coupling comprising, a member having a hose connecting element, a plurality of internally screw-threaded gripping jaws mounted on the member and arranged to form a continuous gripping surface, a rotatable bushing having eccentrics for displacing said jaws radially to open and close the same, means for connecting the jaws with said bushing, and means for actuating said rotatable bushing.

4. A hose coupling comprising, a member having a hose connecting element, a plurality of internally screw-threaded gripping jaws mounted on the member and arranged to form a continuous gripping surface, a rotatable bushing having eccentrics for displacing said jaws radially to open and close the same, means for guiding the jaws whereby said jaws are confined to a radial movement, keepers connecting the jaws with said bushing, and means for actuating said rotatable bushing.

5. A hose coupling comprising, a member having a hose connecting element, a plurality of internally screw-threaded gripping jaws mounted on the member and arranged to form a continuous gripping surface, a rotatable bushing having eccentrics for displacing said jaws radially to open and close the same, blocks for guiding the jaws, whereby said jaws will only move radially, keepers connecting the jaws with said bushing, and means for actuating said rotatable bushing.

6. A hose coupling comprising, a member having a hose connecting element, a plurality of internally screw-threaded gripping jaws mounted on the member and arranged to form a continuous gripping surface, a rotatable bushing having eccentrics for displacing said jaws radially to open and close the same, blocks having chordal guide faces for guiding the jaws, whereby said jaws will only move radially, keepers connecting the jaws with said bushing, and means for actuating said bushing.

7. A coupling comprising, a flanged nipple, guide blocks integral with said nipple, a retaining ring mounted on the blocks, an annular bushing rotatably confined between the ring and flange and surrounding said blocks, a rotatable collar fastened to said bushing, jaws slidably confined between the nipple and ring and having their flat back sides engaging the ring and their flat sides engaging the blocks, said jaws being arranged to form a continuous gripping surface and eccentric connections between the jaws and bushing for displacing said jaws upon rotation of the bushing.

8. A coupling comprising, a flanged nipple, guide blocks integral with said nipple, a retaining ring mounted on the blocks, an annular bushing rotatably confined between the ring and flange and surrounding said blocks, a rotatable collar fastened to said bushing, jaws slidably confined between the nipple and ring and having their flat back sides engaging the ring and their flat sides engaging the blocks, said jaws being arranged to form a continuous gripping surface and keepers connecting the jaws with said bushing.

FLOY H. EZELL.